Jan. 31, 1956

H. B. ALBERS 2,732,938

EXTRUSION PRESS

Filed May 15, 1952

INVENTOR.
HEINRICH B. ALBERS
BY
Pollard and Johnston
ATTORNEYS

Jan. 31, 1956

H. B. ALBERS 2,732,938

EXTRUSION PRESS

Filed May 15, 1952

INVENTOR.
HEINRICH B. ALBERS
BY
Pollard and Johnston
ATTORNEYS

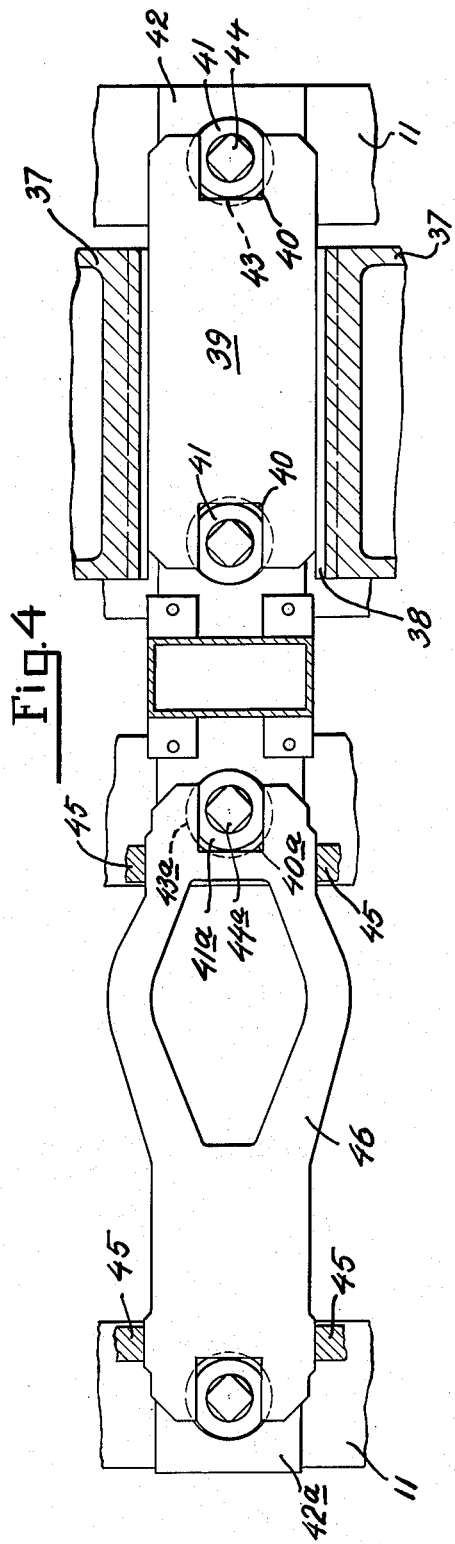

United States Patent Office 2,732,938
Patented Jan. 31, 1956

2,732,938
EXTRUSION PRESS

Heinrich B. Albers, Malverne, N. Y., assignor to Hydropress, Incorporated, New York, N. Y., a corporation of Delaware Application May 15, 1952, Serial No. 287,927

5 Claims. (Cl. 207—3)

The present invention relates to extrusion presses, and is particularly directed to improvements in such presses for effecting alignment of the various parts thereof.

Extrusion presses, of the kind herein considered, usually include a fixed platen structure for supporting a die holder and die, an axially reciprocated ram carrying an extrusion stem and a mandrel, and a container structure positioned between the platen and the ram for holding the material to be extruded through the die by the extrusion stem and mandrel. In such presses, the die and material holding container must be positioned in exact axial or longitudinal alignment with each other and with the extrusion stem and mandrel in order to provide smooth operation, a uniformly extruded product and a minimum of wear on the parts of the press. However, when the extrusion press is a relatively large one, and particularly when the die is replaceable or removable from the platen and the material holding container is movable axially away from the platen for easy replacement of the die and insertion of the material in the container, maintenance of the accurate alignment of the die, the container and the extrusion stem and mandrel presents a difficult problem.

Accordingly, an object of the present invention is to provide an extrusion press having adjustable supports for the die and for the material holding container to permit axial or longitudinal alignment of the die and material holding container relative to each other and relative to the extrusion stem and mandrel.

Another object is to provide an extrusion press of the character indicated, wherein the material holding container is supported on the bed plate of the press by structure which is adjustable both laterally and vertically for aligning the material holding container with the extrusion stem and mandrel.

Still another object is to provide an extrusion press of the character indicated, wherein the platen is mounted on the bed plate of the press by structure which is adjustable both laterally and vertically, and the die is carried by a die holding structure which is adjustable both vertically and laterally on the platen so that the die may be conveniently aligned with the material holding container and with the extrusion stem and mandrel.

In accordance with the present invention the foregoing objects are accomplished by providing an extrusion press which comprises a frame structure including a bed plate and tie rods extending between a housing mounted at one end of the bed plate for supporting the conventional operating pistons and a platen disposed adjacent the other end of the bed plate. The platen is supported on the bed plate or base of the press by a structure which includes rotatable eccentric adjusting means for laterally shifting the platen relative to the bed plate and rotatable screw means for vertically shifting the platen relative to the bed plate. Die holding structure is mounted on the platen and includes rotatable eccentric means for adjusting the die laterally and vertically relative to the platen. Further, structure is provided for mounting a material holding container on the base plate of the press between the platen and an extrusion stem and mandrel extending from the conventional ram actuated by the operating pistons. The structure carrying the material or billet holding container includes rotatable eccentric adjusting means for laterally shifting the container relative to the base plate and rotatable screw means for vertically shifting the container relative to the base plate whereby the container may be positionally adjusted for longitudinal or axial alignment with the extrusion stem and mandrel and the die may be further adjusted for axial alignment with the container.

The foregoing and other objects, features and advantages of the present invention will be manifest in the following detailed description of an illustrative embodiment thereof, when said description is read in connection with the accompanying drawings forming a part hereof, and wherein:

Fig. 4 is a fragmentary horizontal sectional view taken along the line 4—4 of Fig. 1.

Figure 1:
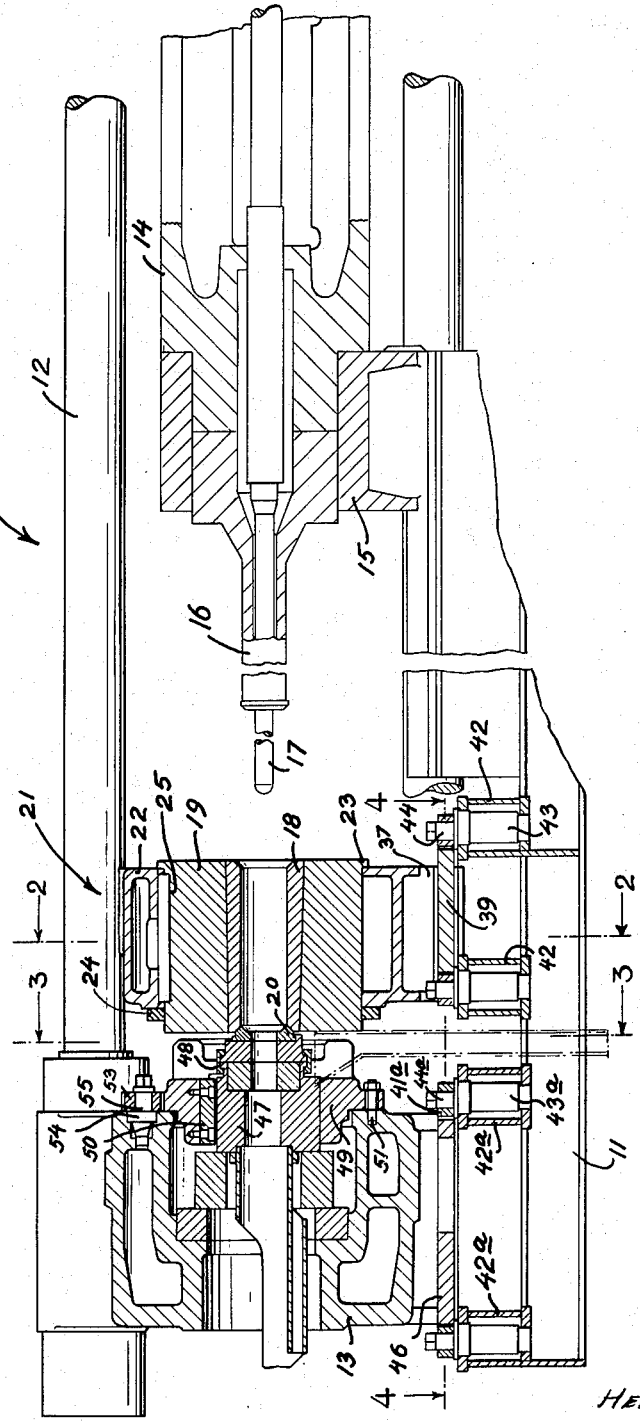
Fig. 1 is a longitudinal sectional view of a portion of an extrusion press embodying the present invention.

Referring to the drawings in detail, wherein the same reference numerals are used to identify the same parts in the several views thereof, an extrusion press embodying the present invention is there shown and generally indicated by the reference numeral 10. The press 10 includes a bed-plate or base 11 and a set of horizontal tie-rods 12 which connect a platen 13, disposed at one end of the base, with a housing (not shown) disposed at the opposite end of the base for carrying the conventional operating pistons. A ram 14, actuated by the above mentioned operating pistons, is supported by a cross-head 15 which is slidable on a suitable guide-way formed on the base 11 for horizontal reciprocation toward and away from platen 13. An extrusion stem 16 and a co-axial mandrel 17 extend from the ram 14 in the direction toward the platen 13. As is usually the case in extrusion presses, the material to be extruded is held or supported, in the form of a billet, within the liner 18 of a container 19 which is disposed between the platen 13 and ram 14 and movable against a die 20 carried by the platen.

In operating the above described conventional elements of an extrusion press, a billet is placed within liner 18 and ram 14 is advanced to project mandrel 17 through the material holding container and the die 20. Further advance movement of the ram, causes the extrusion stem 16 to move through the liner 18 thereby extruding the material between the mandrel and the die opening. It is apparent that hollow tubular members of uniform wall thickness will be produced only if the mandrel 17 is exactly centered within the opening of die 20, and this condition can be achieved only by accurate alignment of the die with the mandrel and extrusion stem in the axial or longitudinal direction. Further, the die 20 and liner 18 of the material holding container must be in accurate axial alignment to provide a tight seal between these elements and thereby prevent leakage or flashing of the extruded material between the meeting faces of the die and liner. Finally, the liner 18 and extrusion stem 16 must be in accurate axial alignment so that the stem will work smoothly within the liner without excessive wear.

Since the die 20 and container 19 are usually removable from their supporting structures to permit replacement thereof and the adaptation of the press to the extrusion of different shapes, maintenance of the necessary axial alignment of the die, the material holding container and the mandrel and extrusion stem presents a difficult problem, and this problem is particularly manifest in large extrusion presses.

In accordance with the present invention, the supporting structures for the material holding container 19 and for the die 20 are constructed to permit independent positional adjustment of these elements relative to the base 11 in both the vertical and lateral directions so that the container may be brought into axial alignment with the extrusion stem and the die may be axially aligned with the container and with the mandrel.

Figure 2:
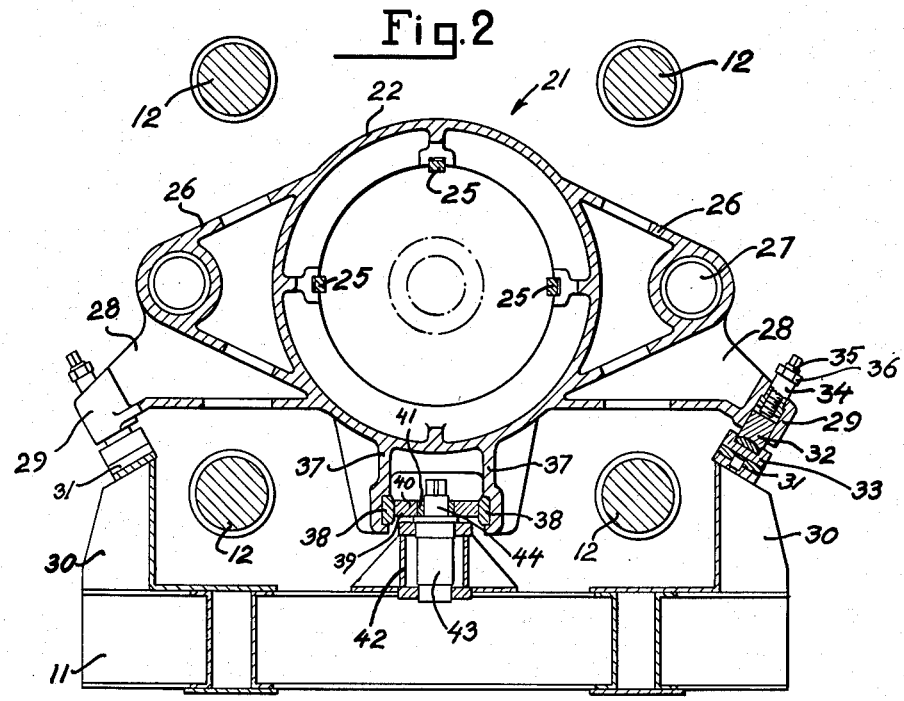
Fig. 2 is a transverse sectional view taken along the line 2—2 of Fig. 1.

In the preferred embodiment of the invention illustrated in the drawings, the supporting structure for the material holding container 19 includes a support frame 21 formed with an annular portion 22 open at its opposite sides to receive the material holding container. In order to hold the container 19 within the annular portion 22 of the support frame, the container is preferably formed with a radial flange 23 at one end to abut against the face of portion 22 remote from the platen 13, and a suitable clamping ring 24 engages around the container to abut against the opposite face of the annular portion. Rotation of the container relative to its support frame is preferably resisted by keys 25 received in suitable key-ways provided in the annular portion 22 and in the container 19. The support frame 21 is also formed with ears 26 extending radially from the annular portion 22 at diametrically opposed locations and having bores 27 for the reception of horizontal arrangements (not shown) provided for moving the support frame toward and away from the platen 13. Outriggers 28 are formed integrally with the ears 26 and terminate in bosses 29 having through-bores which converge downwardly (Fig. 2).

The base or bed-plate 11 is provided with standards 30 at its opposite sides supporting inclined bearing plates 31 disposed normal to the axes of the bores of bosses 29. An adjustable assembly is associated with each boss 29 and includes a support plunger 32 (Fig. 2) slidable in the bore of the boss and having a universally movable foot 33 thereon to bear against the related bearing plate 31. A threaded bushing 34 is disposed in the upper portion of the bore of each boss 29 and receives an adjusting screw 35 which extends therethrough to engage against the upper end of the related plunger 32. A locking nut 36 is preferably threaded on the adjusting screw for engagement against the upper end of bushing 34 thereby locking the adjustment screw relative to the bushing. It is apparent that adjustment of the screws 35 associated with bosses 29 at opposite sides of annular portion 22 of the supporting frame will be effective to vertically adjust the position of a material holding container mounted in that frame relative to the base 11, and hence relative to the extrusion stem 16 which is guided on the base by the cross-head 15. It will also be apparent that the radially disposed bearing plates 31 over which feet 33 are movable provide automatic compensation for heat expansion of the billet container.

In order to provide for adjustment of the support frame 21 in the lateral direction, frame 21 is provided with laterally spaced apart flanges 37 depending from the annular portion 22 and having bearing strips 38 mounted on the confronting faces thereof. A plate 39 (Figs. 1, 2 and 4) is disposed between the bearing strips 38 and slidable vertically, as well as longitudinally, relative to the latter. Plate 39 is formed with parallel-sided slots or notches 40 (Fig. 4) opening at the opposite ends thereof and receiving flat-sided bushings 41 which are longitudinally movable in the respective notches. The base or bed-plate 11 carries two longitudinally spaced apart housings 42, each of which carries a rotatable eccentric device including a cylindrical barrel 43, rotatably mounted within the housing, and an eccentric extension 44 of reduced diameter extending upwardly from the barrel and passing rotatably through the related flat-sided bushing 41. The upper end of each extension 44 is preferably formed with a flat-sided head to permit the engagement therewith of a wrench or other tool for effecting rotation of the eccentric device. It is apparent that horizontal displacement of plate 39, as well as swinging thereof in a horizontal plane, may be effected by rotation of the eccentric devices carried by the two spaced housings 42. Thus, the support frame 21 may be swung about a vertical axis and horizontally displaced to bring the axis of a container mounted therein into the vertical plane extending through the axis of the extrusion stem 16.

Combining the horizontal adjustment of frame 21, provided by the above described eccentric devices, with the vertical adjustment thereof provided by the screws 35 and associated elements, it is possible in the mounting arrangement embodying the present invention to accurately align the container mounted in the frame with the axis of the extrusion stem 16 so that the latter may work freely within the container liner 18 thereby avoiding excessive wear on the latter and the possibility of flash back of the extruded material past the extrusion stem by reason of irregular contact of the latter with the liner at different portions of the stem surface.

Since the die 20 must be adjusted for alignment with the liner 18 which is adjusted, as described above, for alignment with the extrusion stem, the supporting structure for the die preferably has a wider scope of adjustment, relative to the base 11, than the scope of adjustment provided by the structure supporting container 19. In the illustrated embodiment of the invention, this wider scope of adjustment is obtained by providing for the adjustment of platen 13 relative to the base or bed-plate, as well as for the adjustment of the die 20 relative to the platen. The provision for adjustment of the die relative to the platen has the further advantage of permitting accurate alignment of the die with the other parts of the press even when the adjustment of the platen as a whole is hampered by the attachment of the tie-rods thereto.

Figure 3:
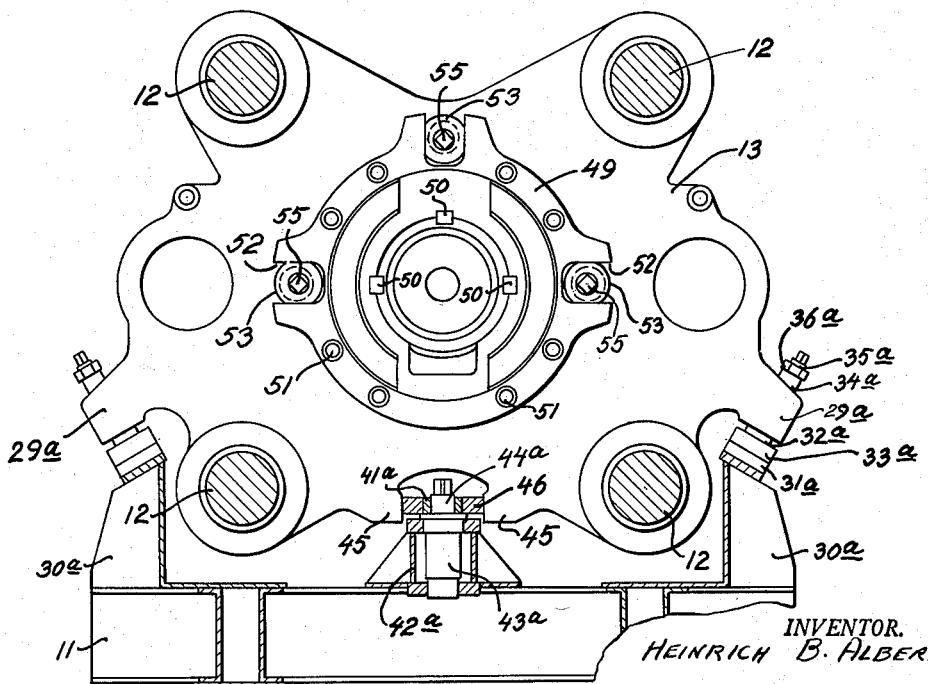
Fig. 3 is a transverse sectional view taken along the line 3—3 of Fig. 1.

The platen 13 is preferably supported on the base 11 by adjustable structure similar to that employed in the mounting of support frame 21 on the base. Thus, as seen in Fig. 3, the support structure for platen 13 includes bosses 29a extending from the opposite sides thereof and formed with through bores which converge downwardly. Standards 30a extend upwardly from the base at its opposite sides and support inclined bearing plates 31a which are substantially normal to the axes of the bores extending through bosses 29a. An adjustable assembly associated with each boss 29a includes a plunger 32a extending slidably into the bore of the boss and having a universally movable foot 33a. A bushing 34a is fixed within the boss 29a and threadably receives an adjusting screw 35a which regulates the extension of plunger 32a from the boss. A locking nut 36a is threaded on the screw 35a to hold the latter in its adjusted position. Thus, rotation of the adjusting screws 35a at the opposite sides of the platen 13 will be effective to vary the vertical position of a die mounted on the platen with respect to the base and hence with respect to the material holding container and the mandrel. In order to provide for lateral adjustment of the platen, the latter is formed with a downwardly opening, longitudinal guideway formed by laterally spaced apart lugs 45. A plate 46 (Figs. 1, 3 and 4) is slidably disposed between the lugs 45 for vertical and longitudinal movement relative to the latter. The plate 46, in a manner similar to the previously described plate 39, is formed with parallel-sided slots or notches 40a opening at the opposite ends thereof and receiving flat-sided bushings 41a which are longitudinally movable within the respective notches. The base or bed-plate 11 carries two longitudinally spaced apart housings 42a which are arranged centrally below the platen adjacent the opposite end faces of the latter. Each housing 42a carries a rotatable eccentric device including a cylindrical barrel 43a, which is rotatable in the housing, and an eccentric extension 44a of reduced diameter extending upwardly from the barrel and passing rotatably through the related flat-sided bushing 41a. The upper end of each eccentric extension 44a is preferably formed with a flat-sided head to accommodate a wrench or other tool for effecting rotation of the eccentric device.

Thus, rotation of the adjusting screws 35a will vary the vertical position of the platen, while rotation of the eccentric devices carried by the housings 42a will effect horizontal displacement and swinging of the platen.

In order to obtain adjustment of die 20 relative to the platen 13, the illustrated embodiment of the invention provides a die carrier 47 on which the die 20 is supported by a suitable die holder 48. The carrier 47 is mounted within an adjustable frame 49 (Figs. 1 and 3) which is secured, in a manner hereinafter described, to the end surface of platen 13 facing toward the material holding container 19. The frame 49 is formed with a circular central opening to receive the die carrier and is preferably provided with keys 50 to prevent rotation of the carrier 47 within the frame 49. The frame 49 is further formed with a series of circumferentially spaced openings through which studs 51 projecting from the platen 13 loosely extend. A nut is threaded on each stud 51, and these nuts, when tightened down, clamp the frame 49 against the platen to secure the frame in its adjusted position. In order to provide for adjustment of the frame 49, the latter is formed with three radially opening, flat-sided slots or notches 52 respectively located at the top and opposite sides of the frame. A flat sided bushing 53 is radially movable in each of the slots 52. An eccentric device is provided for association with each of the bushings 53 and includes a stepped portion 54 rotatable in a suitable bore formed in the platen and an eccentric extension 55 rotatably received in the related bushing 53. The end of the extension 55 is preferably formed with a flat-sided head to be received in a wrench or other tool used in manually rotating the eccentric device.

In adjusting the frame 49, and hence the die 20, relative to the platen 13, the nuts on the studs 51 are loosened, and the eccentric devices associated with the frame 49 are then turned as required to obtain the necessary horizontal or lateral and vertical movement of the frame. After the necessary adjustments have been made, the nuts on studs 51 are again tightened to hold the die supporting frame in its adjusted position.

From the foregoing description of a preferred embodiment of the invention, it will be apparent that an arrangement has been provided in an extrusion press whereby the die and material holding container may be easily adjusted relative to each other and relative to other parts of the press so that the proper axial alignment of the parts may be conveniently obtained.

While a particular preferred embodiment of the invention has been illustrated and described in detail, it is to be understood that the invention is not limited to that precise embodiment and that various changes and modifications may be made therein by one skilled in the art without departing from the scope of the invention as defined in the appended claims.

What is claimed is:

1. In an extrusion press; the combination comprising a base, a support, and means for adjustably mounting said support on said base and including rotatable screw means carried by said support and bearing downwardly on said base to provide for vertical adjustment of the support relative to the base, longitudinal guide means on said support, a plate member movable vertically and longitudinally in said guide means and having longitudinal slots opening at the opposite ends thereof, a flat-sided bushing slidable longitudinally in each of said slots, and an eccentric element rotatably carried by said base and engaging rotatably in each of said bushings so that said support may be displaced horizontally and swung in a horizontal plane, as well as vertically adjusted, for alignment relative to said base and other parts of the press.

2. In an extrusion press; the combination comprising a base, a support for a material guiding member movable in two mutually perpendicular directions relative to said base, means mounting said support in a positive manner on said base, said means including a plate part confined by said support for movement therewith in one direction and slidable relative to said support in the other direction, said plate part having longitudinally spaced slots formed therein, and actuating means disposed between said base and said support for displacing said support in the respective directions relative to said base, said actuating means including a pair of eccentric means rotatably mounted on said base and each engaging one of said slots for moving the support for the material guiding member in one of said directions relative to the base so that the alignment of the guiding member relative to the base and other parts of the press may be varied.

3. In an extrusion press; the combination comprising a base, a support for a material guiding member movable in two mutually perpendicular directions relative to said base, means mounting said support in a positive manner on said base, said means including radially disposed surfaces on said member bearing on radially disposed bearing surfaces on said base for permitting sliding movement of said member on said base in the direction of expansion of said member so as to provide automatic compensation for heat expansion of said member, said means further including a longitudinally slotted plate part confined by said support for movement therewith in one direction and slidable relative to said support in the other direction, and actuating means disposed between said base and said support for displacing said support in the respective directions relative to said base, said actuating means including a pair of eccentric means rotatably mounted on said base and each engaging one of the slots in said slotted plate part for moving the said support in one of said directions relative to the base, to permit alignment of said material guiding member with the other parts of the press.

4. In an extrusion press; the combination comprising a base, a platen movable in two mutually perpendicular directions relative to said base, a frame for supporting an extruding die on said platen, means mounting said frame on said platen including rotatable eccentric means between said frame and platen for effecting vertical and horizontal adjustments of the frame relative to the platen to permit alignment of the die with the other parts of the press, means mounting said platen in a positive manner on said base, said platen mounting means including a longitudinally slotted plate part confined by said platen for movement therewith in one direction and slidable relative to said platen in the other direction, and actuating means disposed between said base and said platen for displacing said platen in the respective directions relative to said base, said actuating means including a pair of eccentric means rotatably mounted on said base and each engaging one of the slots in said plate part for moving the platen in one of said directions relative to the base to permit alignment of the platen with the other parts of the press.

5. In an extrusion press; the combination according to claim 4, wherein said frame for supporting an extruding die has three radial slots therein respectively opening upwardly and at the opposite sides of said frame, and said rotatable eccentric means includes a bushing slidable radially in each of said radial slots, and an eccentric element rotatably carried by the platen and engaging rotatably in each of said bushings.

References Cited in the file of this patent

UNITED STATES PATENTS

| | | |
|---|---|---|
| 2,188,076 | Dinzl | Jan. 23, 1940 |
| 2,214,734 | Loewy | Sept. 17, 1940 |

FOREIGN PATENTS

| | | |
|---|---|---|
| 597,803 | Germany | June 1, 1934 |